(12) United States Patent
Lee et al.

(10) Patent No.: US 6,637,931 B2
(45) Date of Patent: Oct. 28, 2003

(54) PROBE FOR USE IN AN INFRARED THERMOMETER

(75) Inventors: Burt Lee, Hsinchu (TW); Alich Lee, Hsinchu (TW); Cruise Wu, Hsinchu (TW); Ryan Chang, Hsinchu (TW)

(73) Assignee: Oriental System Technology Inc., Hsinchu (TW)

( * ) Notice: Subject to any disclaimer, the term of this patent is extended or adjusted under 35 U.S.C. 154(b) by 0 days.

(21) Appl. No.: 09/935,191

(22) Filed: Aug. 22, 2001

(65) Prior Publication Data

US 2003/0016729 A1 Jan. 23, 2003

(30) Foreign Application Priority Data

Jul. 19, 2001 (TW) .................................... 90117710 A

(51) Int. Cl.⁷ .................................................. G01J 5/02
(52) U.S. Cl. ....................................... 374/131; 374/130
(58) Field of Search ................................ 374/131, 130, 374/132, 133; 600/474

(56) References Cited

U.S. PATENT DOCUMENTS

| | | | | |
|---|---|---|---|---|
| 4,797,840 A | * | 1/1989 | Fraden | 374/133 |
| 4,895,164 A | | 1/1990 | Wood | |
| 5,018,872 A | | 5/1991 | Suszynski et al. | 374/133 |
| 5,159,564 A | * | 10/1992 | Swartzel et al. | 374/178 |
| 5,522,662 A | * | 6/1996 | Shiokawa | 374/130 |
| 5,634,718 A | * | 6/1997 | Martinis et al. | 374/142 |
| 5,653,239 A | * | 8/1997 | Pompei et al. | 374/121 |
| 5,689,087 A | * | 11/1997 | Jack | 374/208 |
| 6,109,782 A | | 8/2000 | Fukura et al. | 374/131 |
| 6,129,673 A | * | 10/2000 | Fraden | 600/474 |
| 6,152,595 A | | 11/2000 | Beerwerth et al. | 374/131 |
| 6,195,581 B1 | * | 2/2001 | Beerwerth et al. | 600/474 |
| 6,203,193 B1 | * | 3/2001 | Egawa | 374/130 |
| 6,203,194 B1 | * | 3/2001 | Beerworth et al. | 374/133 |
| 6,336,742 B2 | * | 1/2002 | Fukura et al. | 374/121 |
| 6,425,688 B1 | * | 7/2002 | Hsu | 374/131 |
| 6,435,711 B1 | * | 8/2002 | Gerlitz | 374/130 |
| 2002/0131473 A1 | * | 9/2002 | Konno | 374/121 |

* cited by examiner

Primary Examiner—Christopher W. Fulton
Assistant Examiner—Mirellys Jagan
(74) Attorney, Agent, or Firm—Ladas & Parry

(57) ABSTRACT

The present invention discloses a probe assembly for used in an infrared ear thermometer. Given that the exchanged thermal radiation and the infrared detector's temperature are known, the subject temperature can be calculated according to Stefan-Boltzman's law. To make the Stefan-Boltzman's law applicable in a dynamic environment where temperature may vary greatly, the contact temperature sensor (thermistor) must acuurately and fast track the temperature of the infrared detector (thermopile sensor). By using the heat transfer theorem, the disclosed assembly makes the thermistor accurately track the cold junction temperature of the thermopile chip without being in an isothermal condition. Not only minimizes the measurement error in a dynamic environment, the design of the disclosed probe assembly also makes a samll and compact infrared thermometer possible.

4 Claims, 6 Drawing Sheets

PROBE FOR USE IN AN INFRARED THERMOMETER

BACKGROUND OF THE INVENTION

1. Field of the Invention

The present invention relates to a probe assembly for use in an infrared ear thermometer, and particularly to a probe assembly which fast adapts to a dynamic enviroment where temperature may vary greatly.

2. Description of Related Art

Infrared ear thermometers have been extensively used to measure human body temperatures. When using the infrared ear thermometer, the probe is positioned into the ear canal; the thermal radiation emitted by the eardrum and nearby tissues is directed to an infrared sensor through a waveguide; a contact temperature sensor tracks the temperature of the infrared sensor; an electronic circuit processes the signals of the infrared detector and the contact temperature sensor according to Stefan Boltzman's law; and then a calculated human body temperature is displayed on a liquid crystal display.

Nowadays, most infrared ear thermometers employ an infrared detector, which has a thermopile chip and a thermistor packed in a same metal can and mounted on the same base plate. The purpose of this kind of arrangement is to keep the thermistor tracking the cold junction temperature of the thermopile chip. Inasmuch as the thermal time constat of the thermistor is different from that of the thermopile chip, it is easy to introduce measurement erros if the thermometer is in a dynamic environment where temperature may vary greatly along with time.

U.S. Pat. No. 4,895,164 discloses a probe assembly with a waveguide and an infrared detector being held in an isothermal state at ambient temperature by a heat conducting block. The drawback of this approch is that a substantially large heat conducting block is required. In addition, an isothermal condition is not necessary in the design of a probe assembly. Since the surfaces of most waveguides are coated with a layer of gold, which has very high reflectivity and very low emissivity, even though a temperature difference exists between the infrared detector and the waveguide, the infrared detector assembly receives little thermal radiation emitted from the inner wall of the waveguide.

U.S. Pat. No. 6,152,595 discloses a probe assembly comprising a radiation sensor (thermopile), a waveguide and a thermal coupling arrangement. As we can understand according to Stefan-Boltzman's law, a probe assembly is impossible to be made without a contact temperature sensor (thermistor) detecting the cold juction temperature of the thermopile chip. Without considering the difference of the thermal time constants between the thermopile sensor and the thermistor, measurement erros will inevitably occur when the thermometer is in a dynamic environment. Furthermore, the thermal coupling arrangement comprising fives parts will complicate the assembly process.

FIG. 1 shows prior art probe 10 of an infrared thermometer, which comprises waveguide 11, heat conducting block 12 and infrared (IR) detector assembly 13. FIG. 2 shows the schematic diagram of IR detector assembly 13, which comprises metal can 21, IR filter 22, thermopile chip 23, thermistor 24, base plate 25 and leads 26. The thermal radiation directed by and through waveguide 11 first passes through IR filter 22 and is then detected by thermopile chip 23, and the temperature of the cold junction of thermopile chip 23 is represented by the temperature of thermistor 24, wherein thermistor 24 and thermopile chip 23 are placed on base plate 25.

The infrared thermometer calculates the temperature Ts of a target object according to Stefan Boltzman's Law, as shown in equation (1):

$$Ts(t)=(Q(t)/KC+Ttp^4(t))^{1/4} \qquad (1)$$

wherein $T_{tp}$ represents the cold junction temperature of thermopile chip 23, Q represents the response of thermopile chip 23 to a thermal radiation source, KC represents a calibration coefficient. However, the cold junction temfperature $T_{tp}$ of thermopile chip 23 is obtained by monitoring the temperatue of thermistor 24. Therefore, the temperature Ts' of the target object calculated by the infrared thermometer is shown in equation (2), $$Ts'(t)=((Q(t)+\Delta Q(t))/KC+Tth^4(t))^{1/4} \qquad (2)$$

wherein $T_{th}$ represents the temperature measured by thermistor 24, Q represents the response of thermopile chip 23 to a thermal radiation source, $\Delta Q$ represents the response of the thermopile chip 23 to waveguide 11 and $\Delta Q$ can be expressed by equation (3), $$\Delta Q=(Twg^4(t)-Ttp^4(t))\times \in_W \times C_W \qquad (3)$$

wherein $\in_W$ represents the emissivity of waveguide 11, $C_w$ represents a coupling factor. Measurement error $\Delta$Ts is shown in equation (4), $$\Delta Ts=Ts'(t)-Ts(t) \qquad (4)$$
$$=((Q(t)+\Delta Q(t))/KC+Tth^4(t))^{1/4}-(Q(t)/KC+Ttp^4(t))^{1/4}$$
$$=((Q(t)+(Twg^4(t)-Ttp^4(t))\times \in_W \times C_W)/KC+Tth^4(t))^{1/4}-(Q(t)/KC+Ttp^4(t))^{1/4}$$

In other words, in a static environment where the ambient temperature is stable, Tth(t)=Ttp(t)=Twg(t), $\Delta Q=0$, and the measurement error $\Delta$Ts is equal to zero. On the contrary, in a dynamic environment where the ambient temperature varies Tth(t)≠Ttp(t)≠Twg(t), $\Delta Q \neq 0$, and a measurement error will occur.

FIG. 3 shows an equivalent model of the probe shown in FIG. 1 responding to temperature, wherein $T_{amb}(t)$ represents the ambient temperature of the environment, $R_{hs}$ represents the thermal resistance of the heat-conducting block, $C_{hs}$ represents the thermal capacitance of the heat-conducting block, $T_{wg}(t)$ represents the temperature of the waveguide, $R_{th}$ represents the thermal resistance of the thermistor, $C_{th}$ represents the thermal capacitance of the thermistor, $T_{th}(t)$ represents the temperature of the thermistor, $R_{tp}$ represents the thermal resistance of the thermopile chip's cold junction, $C_{tp}$ represents the thermal capacitance of the thermopile chip's cold junction, and $T_{tp}(t)$ represents the cold junction temperature of the thermopile chip.

FIG. 4 shows the temperature measurement error of the probe shown in FIG. 1, wherein curve 41 represents the temperature variation $T_{amb}(t)$ of an environment and appears as a step function; curve 42 represents the temperature variation $T_{th}(t)$ of the thermistor, and curve 43 represents the temperature variation $T_{tp}(t)$ of the cold junction of the thermopile chip. Since the thermal resistance of the thermistor is less than that of the thermopile chip, the thermal time constant $\tau_{th}(\tau_{th}=R_{th}\times C_{th})$ of the thermistor is less than the thermal time constant $\tau_{tp}$ ($\tau_{tp}=R_{tp}\times C_{tp}$) of the cold junction of thermopile chip, and the response of the thermistor to temperature variation is faster than that of the thermopile chip to temperature variation. In other words, before the prior art system becomes stable, the thermometer will introduce measurement errors.

Therefore, how to make a thermistor acurrately track the cold junction temperature of a thermopile chip without time lag is an important issue.

SUMMARY OF THE INVENTION

The main object of the present invention is to provide a probe for use in an infrared thermometer, which can accurately measure the temperature of a thermal radiation source in a dynamic environment.

The second object of the present invention is to provide a probe for use in an infrared thermometer, which is easy to manufacture and has a smaller volume than the prior arts.

The third object of the present invention is to provide a probe for use in an infrared thermometer, which could shorten the unstable time period in a dynamic environment.

For obtaining the above objects, the present invention discloses a probe for use in an infrared thermometer. The probe takes advantage of the heat transfer theorem and makes the thermistor accurately and fast respond to the actual cold junction temperature of a thermopile chip in order to reduce measurement errors to an acceptable level in a dynamic environment.

In a first embodiment of the present invention, the probe for use in an infrared thermometer comprises a waveguide, a first heat sink, an IR sensor, a second heat sink and at least one first silicon film. The first heat sink is thermally coupled to the waveguide. The IR sensor keeps an air gap from the first heat sink. The second heat sink is thermally coupled to the IR sensor for reducing the temperature variations of the IR sensor. The first silicon film is situated between the first heat sink and the second heat sink for increasing thermal resistance.

In a second embodiment of the present invention, the probe for use in an infrared thermometer comprises a waveguide, a first heat sink, an IR sensor and a second heat sink. The first heat sink is thermally coupled to the waveguide. The IR sensor keeps a gap from the first heat sink. The IR sensor comprises a thermistor, thermopile and a base plate, and is characterized in that a substrate of less thermal conductivity is situated between the thermistor and the base plate. The second heat sink is thermally coupled to the IR sensor for reducing the temperature variations of the IR sensor.

These and other features and advantages of the present invention will be understood upon consideration of the following detailed description of the invention and the accompanying drawings.

BRIEF DESCRIPTION OF THE DRAWINGS

The present invention will be described according to the appended drawings in which:

FIG. 11($b$) shows a waveform diagram of temperature differences between the thermistor and thermopile chip vs. time according to the present invention.

PREFERRED EMBODIMENT OF THE PRESENT INVENTION

Figure 5:
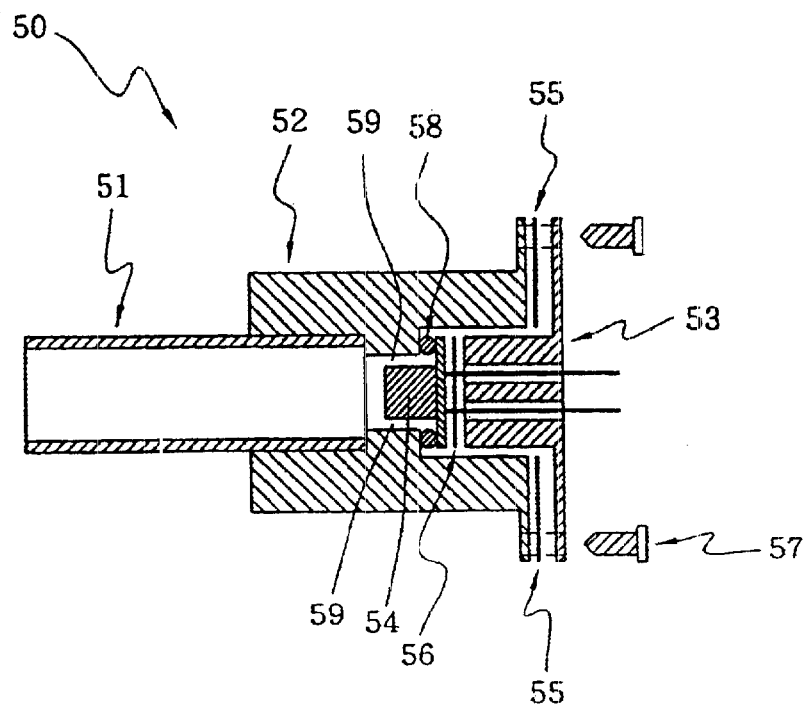
FIG. 5 shows a first embodiment of a probe of an infrared thermometer according to the present invention.

FIG. 5 shows probe 50 of an infrared thermometer according to the first embodiment of the present invention. Probe 50 comprises waveguide 51, first heat sink 52, second heat sink 53, IR sensor 54, O-ring, 58, first silicon film 55 and second silicon film 56. Waveguide 51 directs the thermal radiation emitted from the eardrum and nearby tissues to IR sensor 54 and generates corresponding electronic signals. IR sensor 54 outputs electronic signals to a calculating circuit (not shown in the drawings) for showing the human body temperature. First heat sink 52 is thermally coupled to a waveguide 51 for reducing the temperature variation of waveguide 51. If the surface of waveguide 51 is coated with a layer of gold with high reflectivity, the thermal mass of first head sink 52 could be relatively reduced. Second heat sink 53 is thermally coupled to IR sensor 54 for reducing the temperature variation of IR sensor 54.

For obtaining a better effect of the heat dissipation, first heat sink 52 and second heat sink 53 could be made of aluminum, zinc or its alloy for a better thermal conductivity and a larger specific heat. To avoid direct heat transfer from heat sink 52 to IR sensor 54, first heat sink 52 is not directly thermally coupled to IR sensor 54; there is an air gap 59 between other them. Besides, the temperature of first heat sink 52 is different from that of second heat sink 53 when the probe is heated by the ear canal, and a thermal junction will be generated in the junction between the two heat sinks.

Furthermore, to let thermistor 24 keep tracking the cold junction temperature of thermopile chip 23, at the thermal junction between first heat sink 52 and second heat sink 53, silicon film 55 with less thermal conductivity and a thickness of 0.3 mm could be added, to increase the thermal resistance effect of the equivalent model. Of course, a second film 56 with less conductivity could be placed between IR sensor 54 and second heat sink 53 for increasing the thermal resistance effect of the equivalent model. Lastly, O-ring 58 with good elasticity and poor conductivity acts as a spacer for thermally isolating IR sensor 54 from the first heat sink 52. Two screws 57 are used to fasten first heat sink 52 and second heat sink 53. If possible, the said two screws could be made of nylon.

Figure 6:
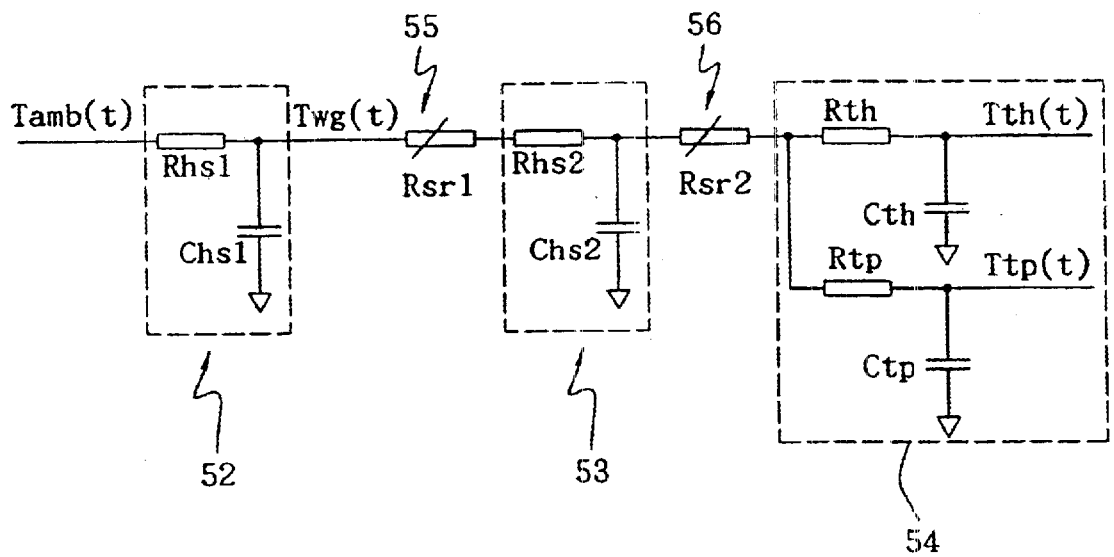
FIG. 6 shows an equivalent model of the probe shown in FIG. 5 responding to the ambient temperature.

FIG. 6 shows an equivalent model of the probe shown in FIG. 5 responding to the temperature. Apparently, the heat progresses through first heat sink 52, first silicon film 55, second heat sink 53 and second silicon film 56 to get inside IR sensor 54. Compared to the prior art, the present invention can reduce the thermal conducting speed, and makes both thermistor 24 and thermopile chip 23 simultaneously respond to the temperature variation in a dynamic environment.

Figure 7:
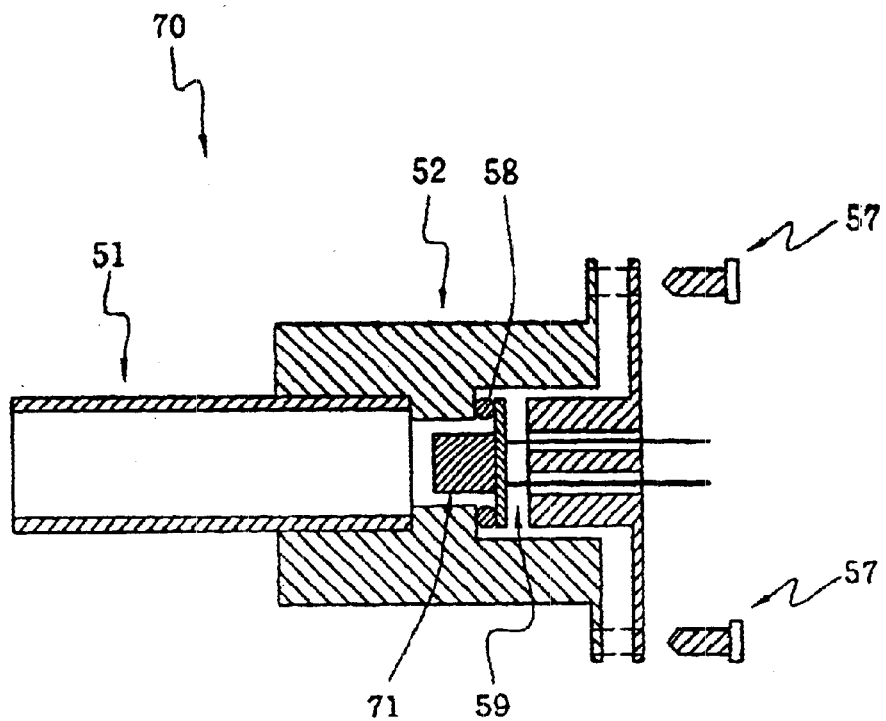
FIG. 7 shows a second embodiment of a probe for an infrared thermometer according to the present invention.

FIG. 7 shows probe 70 of an infrared thermometer according to a second embodiment of the present invention. The difference from probe 50 of the infrared thermometer shown in FIG. 5 is that probe 70 does not have first silicon film 55 and second silicon film 56. For achieving the purpose of raising the time constant of thermistor 24 to approach that of the cold junction of thermopile chip 23, the present invention changes the internal structure of IR sensor 71 as shown in FIG. 8.

Figure 1:
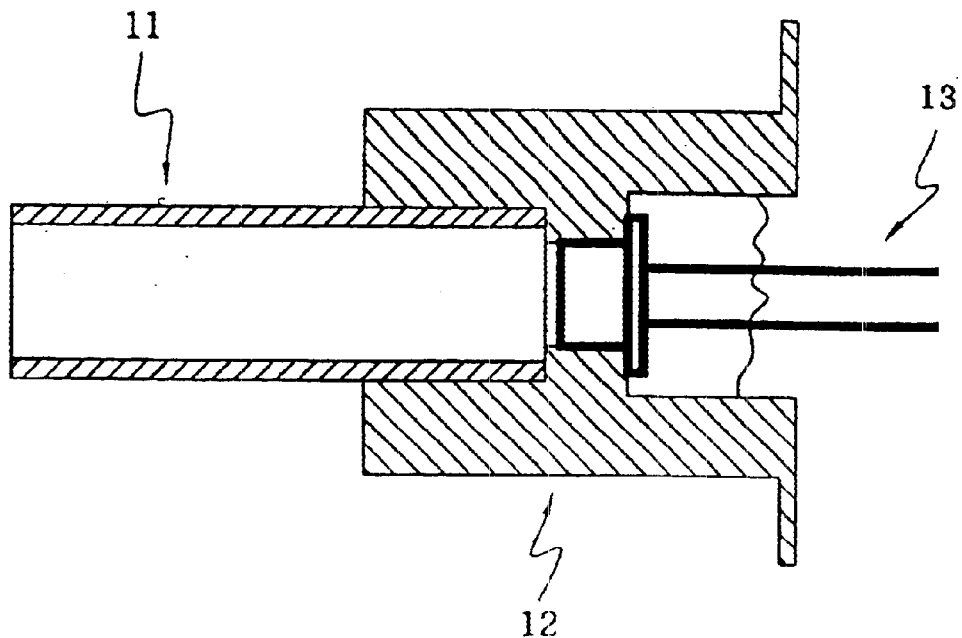
FIG. 1 shows a prior art probe of an infrared thermometer.
Figure 2:
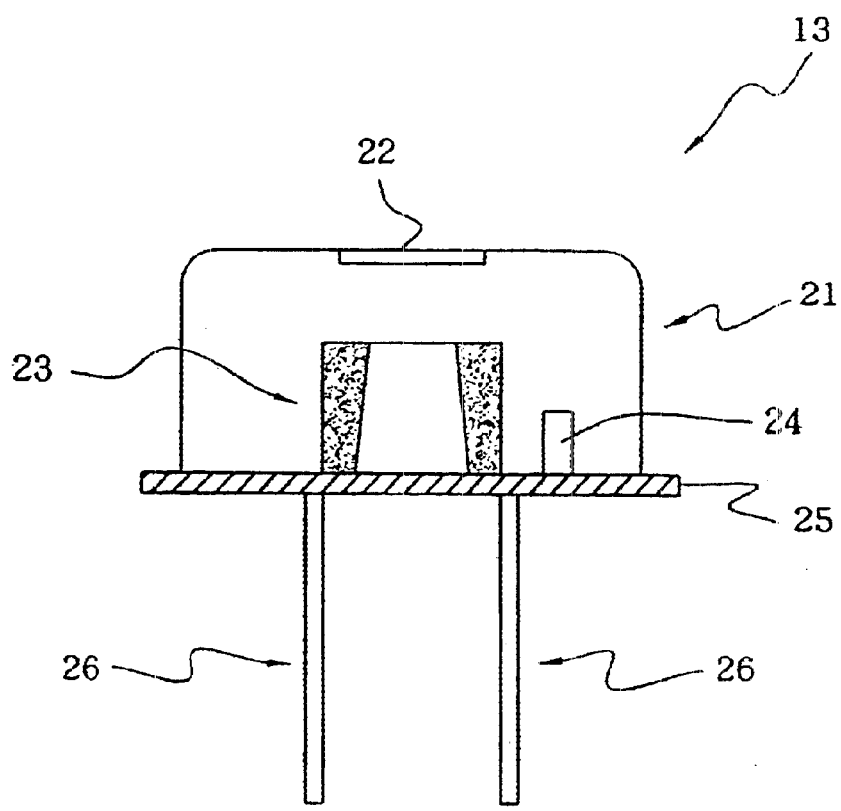
FIG. 2 shows a schematic diagram of a prior art IR detector assembly.
Figure 3:
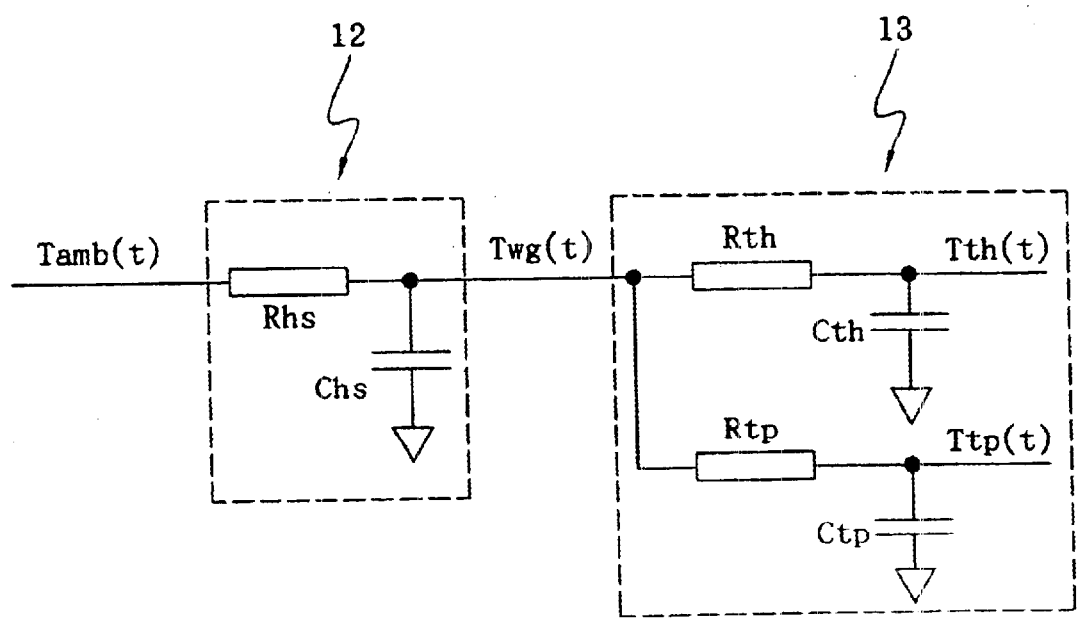
FIG. 3 shows an equivalent model of the probe shown in FIG. 1 responding to the temperature.
Figure 4:
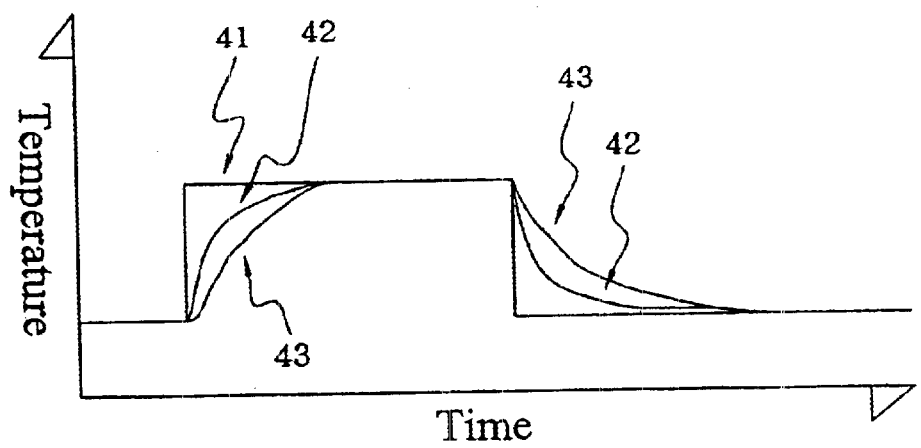
FIG. 4 shows temperature measurement errors of the probe shown in FIG. 1.
Figure 8:
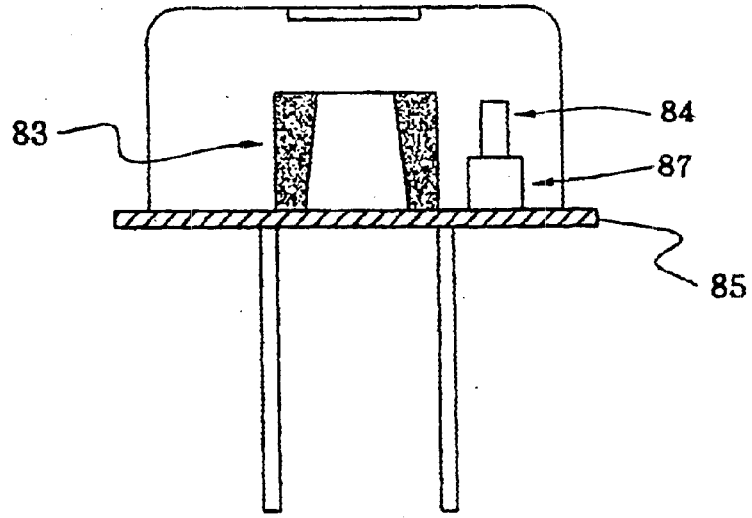
FIG. 8 shows an IR sensor according to the present invention.

FIG. 8 shows an IR sensor according to the present invention. The difference from IR sensor 13 shown in FIG. 2 is that substrate 87 with less thermal conductivity (such as a silicon substrate) is positioned between thermistor 84 and base plate 85 of IR sensor 71 to increase the thermal resistance effect of the equivalent model. Like the first embodiment of the present invention, base plate 85 is thermally coupled to second heat sink 53.

Figure 9:
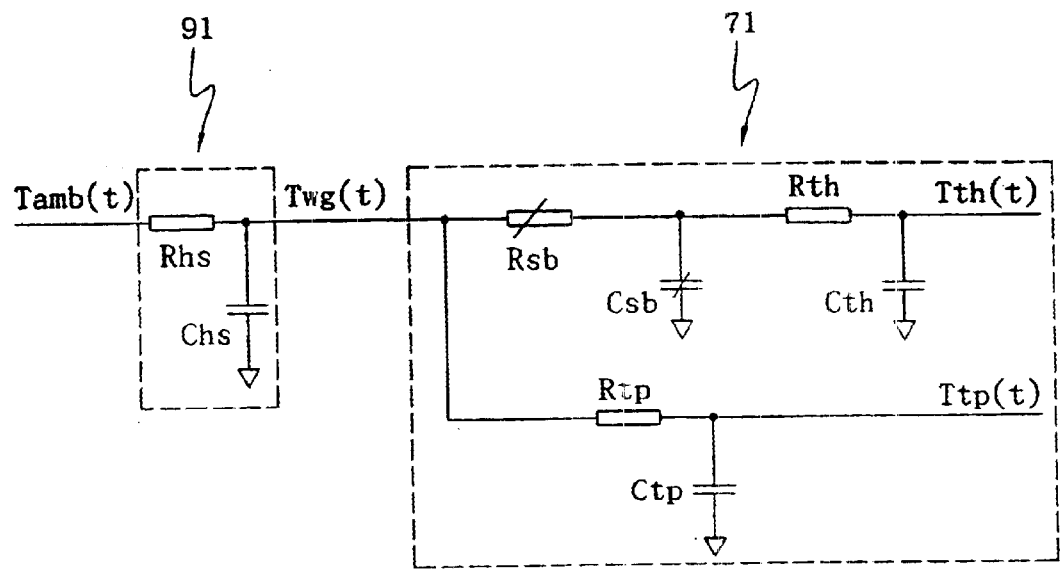
FIG. 9 shows an equivalent model of the probe shown in FIG. 7 responding to the ambient temperature.

FIG. 9 shows an equivalent model of probe 70 shown in FIG. 7 responding to the temperature, wherein block 91 comprises an equivalent thermal resistance $R_{hs}$ and equivalent thermal capacitance $C_{hs}$, which represent a model combining first heat sink 52 and second heat sink 53, and IR sensor 71 can be represented by the thermal resistance $R_{sb}$ and thermal capacitance $C_{sb}$ representing substrate 87, thermal resistance $R_{sb}$ and thermal capacitance $C_{sb}$ representing thermistor 84, and thermal resistance $R_{tp}$ and thermal capacitance $C_{tp}$ representing thermopile chip 83. Compared to the prior art, thermistor 84 (including the substrate 87) of the present invention has the property of a larger thermal time constant, and its thermal time constant is also closer to that of the cold junction of thermopile chip 83.

Figure 10:
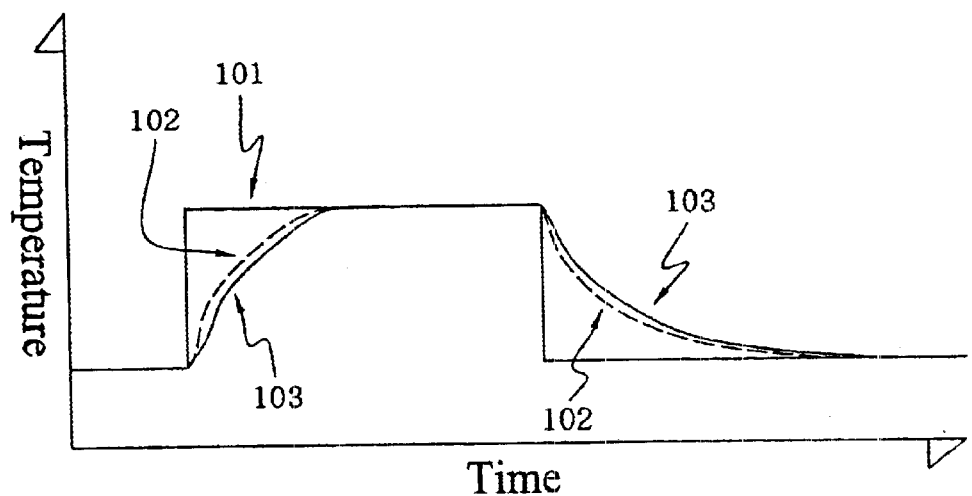
FIG. 10 shows temperature curves of the probe shown in FIG. 7.

FIG. 10 shows the temperature curves of the probe shown in FIG. 7, wherein curve 101 represents the temperature variation $T_{amb}(t)$ of an environment and appears as a step function; curve 102 represents the temperature variation $T_{th}(t)$ of the thermistor; and curve 103 represents the temperature variation $T_{tp}(t)$ of the cold junction of the thermopile chip. Since the thermal time constant of the thermistor is close to that of the cold junction of the thermopile chip, only an very small error will occur by using the temperature of the thermistor to represent that of the cold junction of the thermopile chip when measuring in a dynamic environment.

Figure 11A:
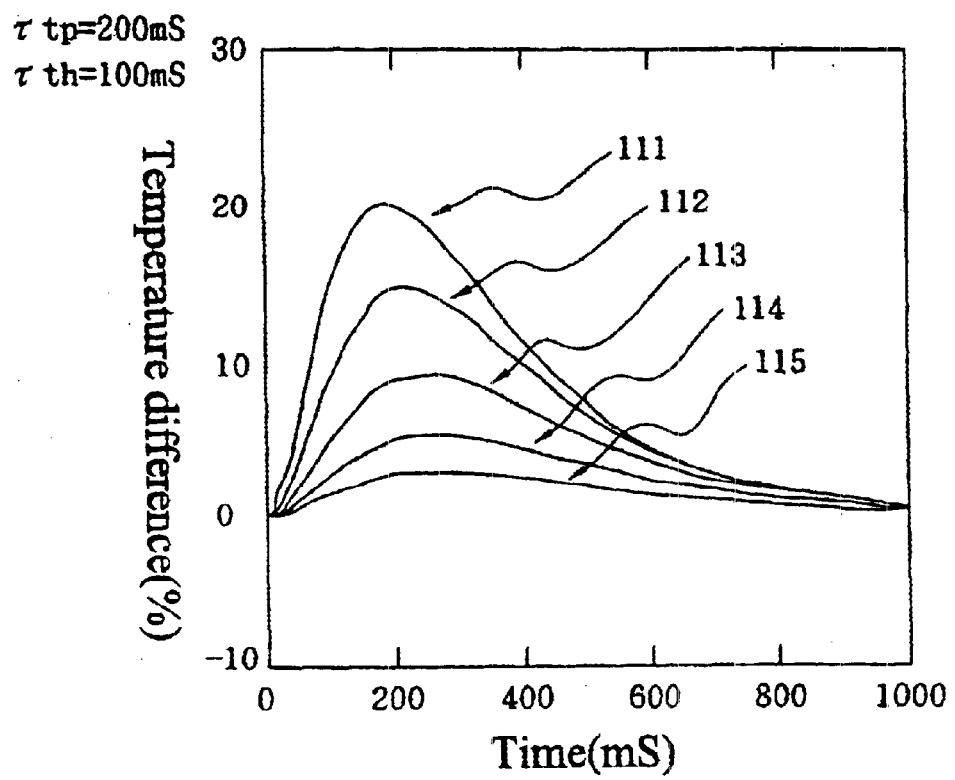
FIG. 11($a$) shows a waveform diagram of temperature differences between the thermistor and thermopile chip vs. time by using prior art methods.
Figure 11B:
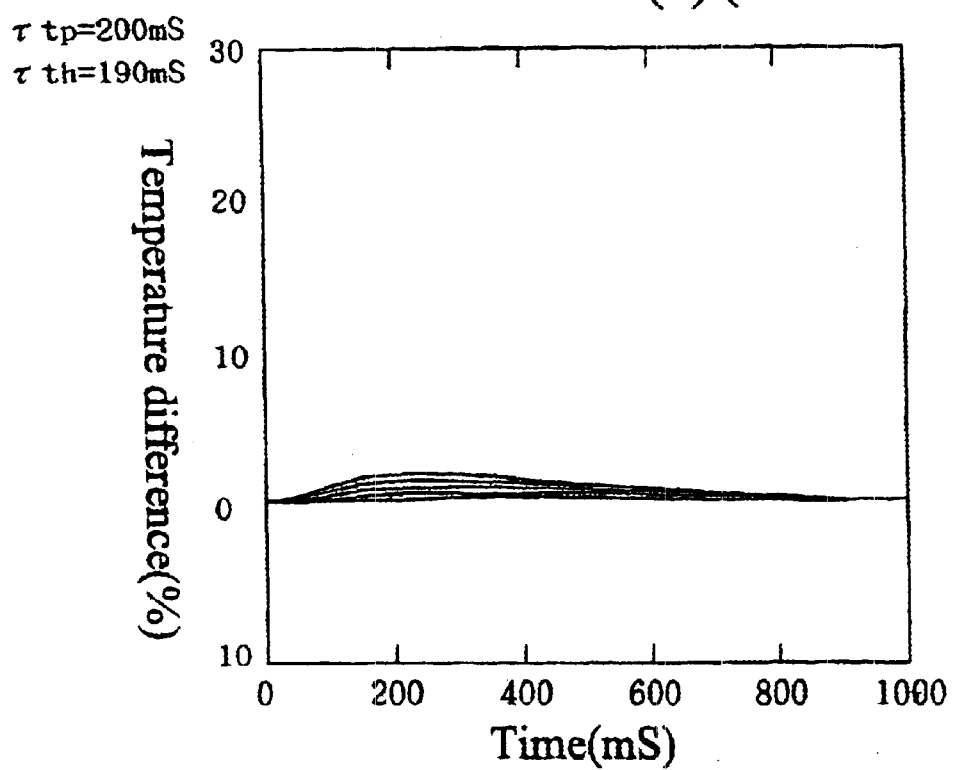

FIG. 11(a) shows a simulation diagram of temperature differences between the thermistor and thermopile chip vs. time by using prior art methods. In this simulation model, the thermal time constant $\tau_{tp}$ is assumed as 200 mS, $\tau_{th}$ is assumed as 100 mS, curve 111 represents a heat sink with a thermal time constant 100 mS, curve 112 represents a heat sink with a thermal time constant 200 mS, curve 113 represents a heat sink with a thermal time constant 400 mS, curve 114 represents a heat sink with a thermal time constant 800 mS, and curve 115 represents a heat sink with a thermal time constant 1600 mS. In a dynamic environment, the temperature difference between the thermistor and the cold junction of a thermopile chip of the prior art infrared thermometer are large, and a long time will be taken to reach a thermal balance condition. FIG. 11(b) shows a waveform diagram of the temperature differences between the thermistor and the cold junction of the thermopile chip vs. time according to the present invention. Since the second embodiment of the present invention raises the thermal time constant of the thermistor (in this embodiment, $\tau_{th}$ is equal to 190 mS), in a dynamic environment, the temperature difference between the thermistor and thermopile chip is small, and the thermal balance condition could be reached in a short time. In other words, the present invention could not only accurately measure the cold junction temperature of the thermopile chip, but also reduce the unbalance time in a dynamic environment.

The above described embodiments of the present invention are intended to be illustrative only. Numerous alternative embodiments may be devised by those skilled in the art without departing from the spirit of the following claims.

What is claimed is:

1. A probe for use in an infrared thermometer, comprising:
   a waveguide;
   a first heat sink thermally coupled to said waveguide;
   an IR sensor for sensing thermal radiation directed by and through said waveguide;
   a spacer between said first heat sink and said IR sensor for thermally insulating said IR sensor from said first heat sink, wherein the spacer is an O-ring with good elasticity and poor thermal conductivity surrounding the IR sensor;
   a second heat sink thermally coupled to one end of said IR sensor; and
   at least one first silicon film positioned between said first heat sink and said second heat sink for increasing thermal resistance.

2. The probe of claim 1, wherein at least one second silicon film is positioned between said IR sensor and said second heat sink.

3. The probe of claim 1, wherein said first heat sink and said second heat sink are fixed by screws.

4. The probe of claim 1, wherein said first heat sink and said second heat sink are made of zinc or its alloy.

* * * * *